United States Patent [19]

Aubin et al.

[11] 4,007,969

[45] Feb. 15, 1977

[54] DEVICE FOR FLUIDIZING AND DISTRIBUTING POWDER

[75] Inventors: Gèrard Aubin, Evreux; Michel Arsène Braguier, Paris; Christian Naturel, Pacy-sur-Eure; Etienne M. Poulin, Evreux; Joseph A. Wattre, Bobigny, all of France

[73] Assignees: Letat Francais represente par le Ministre des Postes et Telecommunications, Moulineaux; Desmarquest et C.E.C. S.A., Montrouge, both of France

[22] Filed: July 14, 1975

[21] Appl. No.: 595,356

[30] Foreign Application Priority Data

July 16, 1974 France .................... 74.24702

[52] U.S. Cl. .................. 302/25; 241/39; 259/4 R; 302/46; 302/57

[51] Int. Cl.² .............................. B65G 53/28

[58] Field of Search ............... 302/17, 24, 25, 29, 302/39, 40, 45, 51, 63, 46, 57; 239/434, 433, 543, 419.3; 222/193; 259/4 R, 4 AB, 18; 241/39, 40; 209/144, 146, 147, 148, 211

[56] References Cited

UNITED STATES PATENTS

| | | | |
|---|---|---|---|
| 1,686,713 | 10/1928 | Scott | 302/25 |
| 2,237,091 | 4/1941 | Stephanoff | 241/39 X |
| 2,666,626 | 1/1954 | True | 302/25 X |
| 2,821,346 | 1/1958 | Fisher | 302/63 X |

*Primary Examiner*—Evon C. Blunk
*Assistant Examiner*—James L. Rowland
*Attorney, Agent, or Firm*—McNenny, Pearne, Gordon, Gail, Dickinson & Schiller

[57] ABSTRACT

A device for fluidizing and distributing a powder in suspension in a carrier gas, characterized in that it comprises, between an inlet conduit fed with said powder and an outlet conduit adapted to distribute the powder once fluidized, a separating means dividing said inlet conduit into two pipes which open and converge into a chamber communicating with said outlet conduit.

3 Claims, 4 Drawing Figures

DEVICE FOR FLUIDIZING AND DISTRIBUTING POWDER

The present invention relates to a device for fluidizing and distributing a powder in suspension in a gas. It can be applied with advantage to powder-projecting devices, e.g. to projection installations comprising a plasma torch.

In quite a number of applications, when use is made of a powder in suspension in a gas, it is desirable to achieve a thorough and homogeneous fluidization of said powder, followed by an even distribution of the thus-fluidized powder. The devices in present use sometimes fail to be satisfactory in this connection, since they leave heaps of particles or agglomerates, on the one hand, and insufficiently lend themselves to an even distribution of the powder up to the apparatus adapted to use said powder, on the other hand, in view of their bulkiness and of their weight which remove them from said apparatus by distributing conduits in which new agglomerates are unavoidably formed again.

The present invention precisely aims at a device adapted to achieve such a thorough and homogeneous fluidization of a powder, and free from the drawback of a re-agglomeration of the fluidized powder.

More specifically, the object of the invention is a device for fluidizing and distributing a powder in suspension in a carrier gas, characterized in that it comprises, between an inlet conduit fed with said powder and an outlet conduit adapted to distribute the powder once fluidized, a separating means dividing said inlet conduit into two pipes which open and converge into a chamber communicating with said outlet conduit.

Preferably, said two pipes are terminated by nozzles, the axes of which converge to a point in the vicinity of the wall of said chamber.

Still preferably, said chamber comprises no corners and is advantageously of spherical shape. Still preferably, the outlet conduit communicates with the chamber through an opening, or port, located in the vicinity of the center of said chamber. According to a preferred embodiment, the exhaust-tubing is constituted by two tubes with conical end-portions nested one inside the other with an adjustable clearance, said tubes serving for the flow of a gas similar to the carrier gas and constituting a section-device of the venturi-type.

The invention will be more readily understood from the following description given merely by way of example, with reference to the accompanying drawing, in which.

Figure 1:
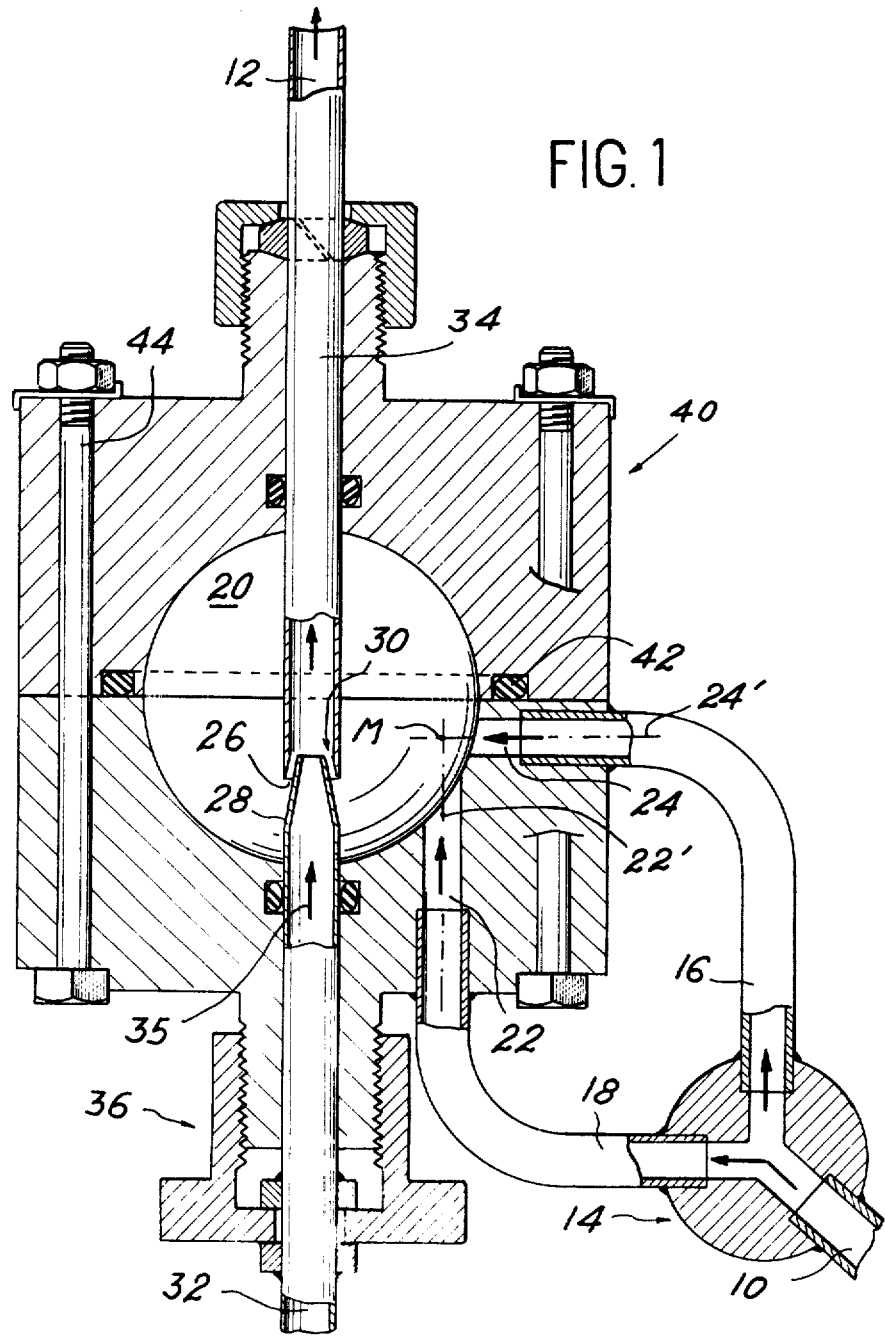
FIG. 1 is a cross-section of the device according to the invention.

The preferred embodiment, such as shown in FIG. 1, is provided, between an inlet conduit 10 and an outlet conduit 12, with a separating means, or separator, 14, dividing inlet conduit 10 into two pipes 16, 18, which open and converge in a chamber, or manifold, 20, communicating with said outlet conduit 12.

Pipes 16, 18 are terminated by two nozzles 22, 24, the axes 22', 24' of which converge to a point M located within chamber 20, in the vicinity of the wall thereof.

Chamber 20 is exempt from any corners or rough excrescences; according to a preferred variant, it is of spherical shape, but it would not be going beyond the scope of the present invention to resort to a chamber of, e.g., oblong, or ellipsoidal, shape.

Outlet conduit 12 is in communication with chamber 20 through an opening, or gap, 26 provided between the conical end-portions 28 and 30 of two tubes 32, 34, respectively. Tube 32 is fed, through its end-portion 35, with a gas similar to the powder-carrying gas. Gap 26 between the two conical portions thus constitutes a suction device of the venturi type.

Tube 32 is preferably mounted on a system 36 permitting to adjust the position thereof with respect to tube 34, whereby the size of gap 26 can be caused to vary.

The whole device is machined in a block 40 constituted by two parts connected by means of tie-rods 44, with a sealing joint 42 there between. Block 40 can be made of metal, or a plastic material, or any other material, e.g. transparent; in the latter case, it is possible to watch and supervise the operation of block 40.

The principle of operation of the device according to the invention is as follows:

the pressurized gas, carrying a powder made of a mixture of particles, grains and agglomerates, is fed from a distributing means (not shown), located upstream of inlet conduit 10. Separator 14 distributes said powder and its carrier-gas between pipes 16, 18 opening into chamber 20 in the vicinity of point M where a thorough and homogeneous fluidization of the powder takes place.

This fluidization step results both from the interaction of the two carrier-gas jets at the extremity of nozzles 22, 24, and from the spherical shape of chamber 20, according to the following process:

the velocities of the powder particles introduced into chamber 20 are such that, at the moment the two jets are interacting in the vicinity of point M, the kinetic energy thereof is capable of disrupting the bond between the particles arranged in agglomerates.

Should any agglomerate happen not to be destroyed while passing through the zone of interaction, it would very likely be destroyed later on prior to leaving chamber 20, since, in view of its spherical shape, said chamber imparts to said agglomerate a whirling movement during which it is caused to collide with other particles or agglomerates moving along different paths.

Since the particle extracting zone 26 is in the vicinity of the sphere center, the greater the particle mass is (and, therefore, the bigger the agglomerates are), the smaller the probability of an extraction is, since centrifugal force moves them away from the sphere center. Accordingly, the period of stay of the agglomerates inside chamber 20 will increase according to their mass, which contributes to increase the number of collisions between the agglomerates and, therefore, the probability of their destruction. Thus, in the central portion of chamber 20 is generated a privileged zone, wherein the powder reaches a high grade of fluidization with a very large percentage of elementary grains in homogeneous suspension throughout the carrier-gas.

The second function of the device according to the invention, which permits an even distribution of the fluidized powder, is ensured by the suction system provided in the vicinity of the center of chamber 20, according to the following process:

the fluidized particles in homogeneous suspension within the chamber central zone are evenly sucked, due to the negative-pressure resulting from the flow of gas along tubes 32, 34. The gas is subsequently driven through conical end-portions 28, 30, then along outlet tube 34, up to an apparatus located beyond outlet conduit 12.

These powder distributing means are specially suited to a simple adjustment of tube 32 with respect to tube 34, this adjustment being achieved by modifying the spacing between cones 28 and 30, e.g. by means of an adjusting device 36.

Such an output variation, in addition to being obtained in a very simple manner, has the advantage of prohibiting an ill-timed accumulation of powder within chamber 20 and of permitting to transfer the required flow-rate of powder in its entirety to the receiving apparatus.

The expansion of the jets in nozzles 22 and 24, together with the extraction of the powder fluidized in the chamber central zone, in addition to the already mentioned advantages, have the advantage of forming a damping device specially efficient for suppressing surges in the powder flow-rate, such surges being due either to the upstream fluidization system, or to variations of the carrier-gas pressure, for instance.

Figure 2A:
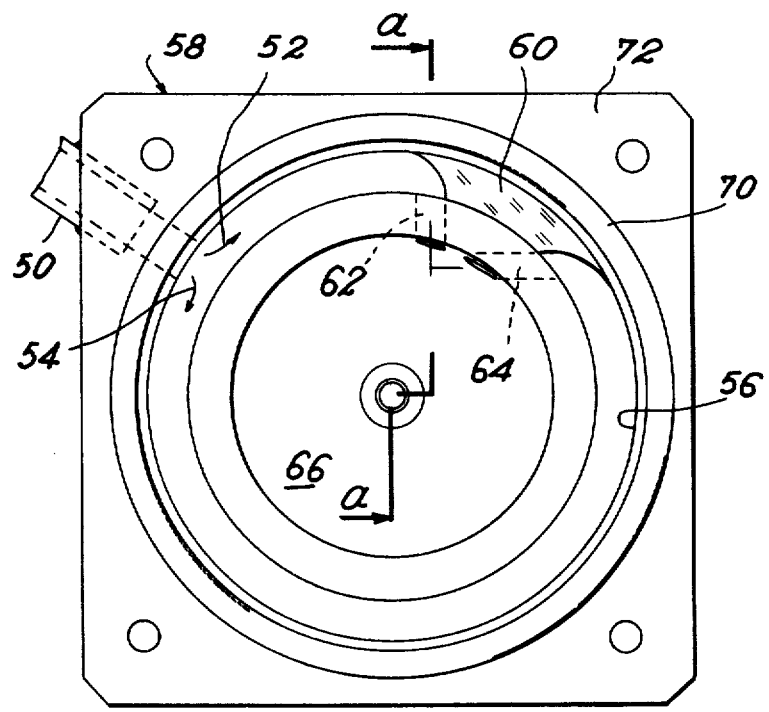
FIGS. 2a and 2b illustrate a variant of the device according to the invention, FIG. 2b being a cross-section in the direction of line a—a of FIG. 2a, and FIG. 3 illustrates the application of the device according to the invention to an installation for projecting powder by means of a plasma torch.
Figure 2B:
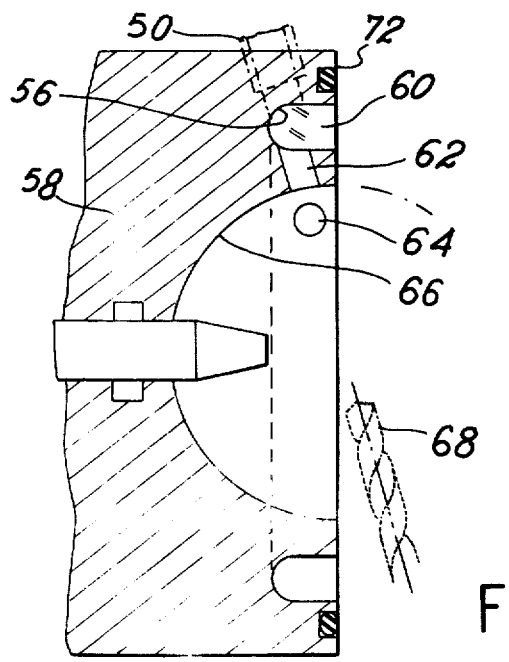

In FIGS. 2a and 2b is shown another embodiment of the device according to the invention, wherein the separator two pipes are part-and-parcel of the chamber body. In FIG. 2a, inlet conduit 50 is shown as divided into two channels 52, 54 formed by machining a groove 56 in body 58 of the device.

This groove is obstructed by a partition 60, at the level of two conduits 62, 64 drilled through block 58 and opening into spherical cavity 66 at any point.

FIG. 2b, as stated above, is a cross-section of the device of FIG. 2a along line a—a, in which is shown a drill 68 for machining conduit 64. An o-ring 70 provides the required tightness between the two parts of the device along plane 72.

The operation is the same as that of the embodiment of FIG. 1, except that the separator is part-and-parcel of body 58 of the device, so that the latter is less bulky.

Quite obviously, the shape and arrangement of the various conduits for the circulation of powder can be modified without going beyond the scope of the invention, provided a separator is always associated to a chamber.

The device according to the invention can operate with a large number of powders in suspension in a gas, and the latter can be of any type. By way of example and without any limitation, the following powders can be cited: ceramic-, alumina-, chromium oxide-, beryllium oxide powders, powders of metals such as copper, tungsten.. or chromium-nickel alloys or carbide powders. The carrier-gas can be, e.g., nitrogen, argon or hydrogen.

The applications of the fluidizing device according to the invention are varied and relate, in particular, to the projection of powder for making coatings, to electronics, to the plastic, cosmetic or pharmaceutical industries.

Figure 3:
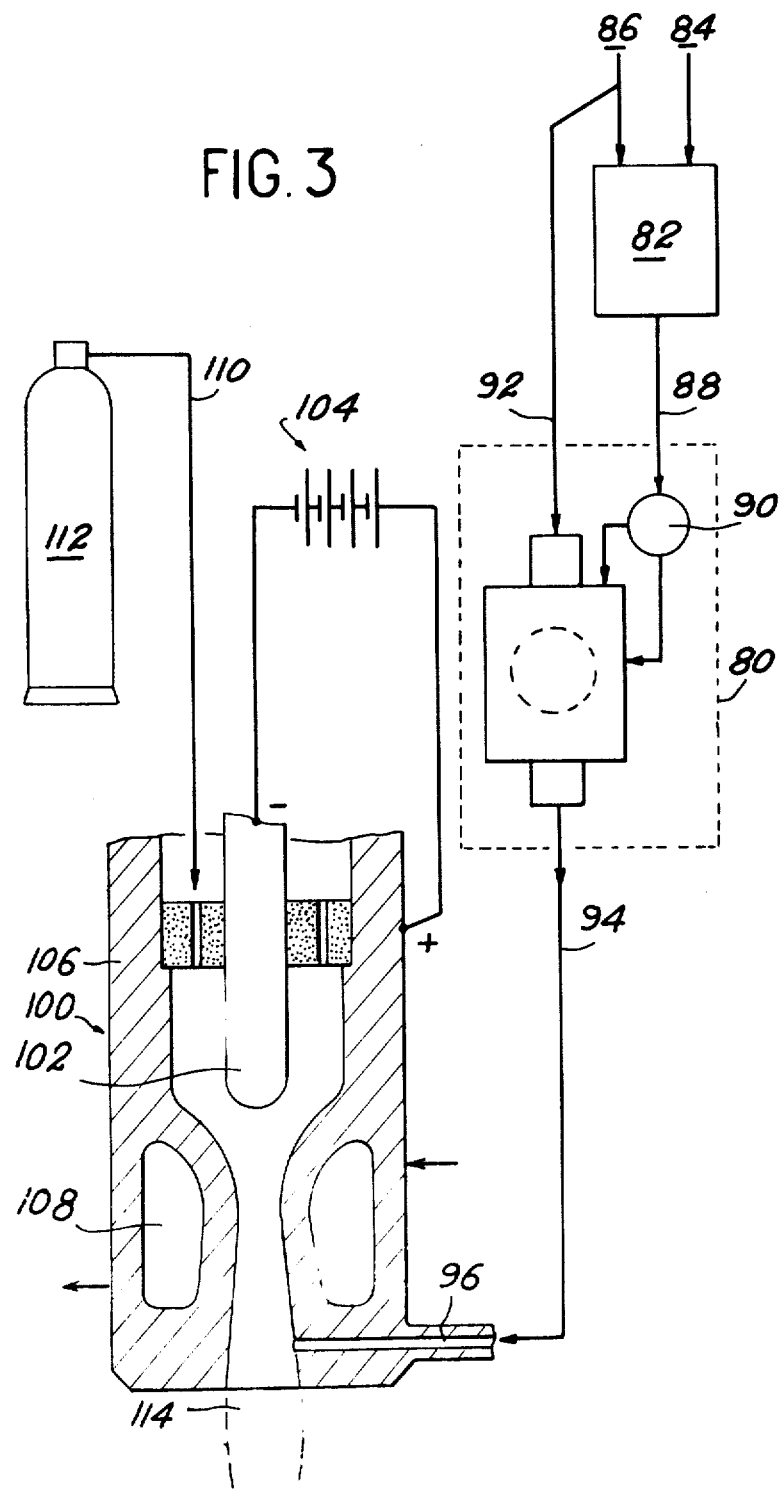

Merely by way of example, FIG. 3 illustrates the use of the device according to the invention in an installation for projecting powder by means of a plasma torch.

In the figure, the device according to the invention is designated by reference numeral 80.

It is fed upstream by a conventional distributor 82 connected to a powder source 84 and to a carrier-gas tank 86. The outlet of distributor 82 is connected to inlet 88 of device 80 according to the invention, said inlet being, in its turn, connected to separator 90. The outlet of gas-tank 86 is mounted in parallel with inlet 92 of the venturi-type suction system of device 80 according to the invention. Thus, at outlet 94, we have a fluidized powder which is injected through pipe 96, into a plasma torch 100.

Conventionally, the latter comprises a cathode 102 connected to the negative pole of a voltage-source 104, and an anode 106 connected to the positive pole. Said anode is cooled by a flow of coolant 108. The plasma torch is fed with gas through conduit 110 connected to a gas tank 112. The powder, once fluidized by device 80 according to the invention, is injected into the tongue of flame 114 generated by the torch.

In such an application, the fluidizing device according to the invention improves the features of distributor 82, by:

extending its range of use to very fine powders, of a grain-size of about 1 micron or less;

cancelling a large portion of the agglomerates often to be found in the powders distributed by the majority of conventional distributer;

rendering the fluidization of powder both more through and more homogeneous;

preventing powder-distribution surges, specially numerous in some distributors, from re-appearing in the receiving apparatus, viz. the plasma-torch in the present case;

annihilating the risk of having big agglomerates formed between the fluidizing zone 82 and zone 114 of operation, in view of the possibility of making conduit 94 very short, taking account of the small volume of device 80.

In addition, the device according to the invention does not interfere with the distributing device 82 mounted ahead of the whole assembly.

It clearly appears from the above description that the device according to the invention is very easily operated, which, in addition to the fact that it contains no moving part whatever, makes it quite reliable.

It can be very easily disassembled and re-assembled. There is no risk for the powder to be contaminated. This device can be manufactured at low cost and it can be used with any fluidized-powder receiving device of the prior art.

What is claimed is:

1. A device for fluidizing and distributing a powder in suspension in a carrier gas comprising:

an enclosed cornerless chamber having an inner wall and a center;

inlet conduit means for feeding a powder to be fluidized into said chamber;

separating means dividing said inlet conduit into two pipes communicating with said chamber, said pipes having axes which converge to a point in the vicinity of said wall; and outlet conduit means for distributing said powder once fluidized, said outlet conduit means having an opening communicating with said chamber, and said opening being located in the vicinity of said center of said chamber.

2. A device according to claim 1 wherein said outlet conduit means includes two tubes with conical end portions nested one inside the other to form said opening, said tubes being adapted to carry a flow of gas similar to the carrier gas, and said end portions and said opening constituting a suction device of the venturi-type.

3. A device according to claim 2, wherein one of said tubes is mounted on means for adjusting its position with respect to the other of said tubes.

* * * * *